United States Patent [19]

Adachi et al.

[11] 4,178,756

[45] Dec. 18, 1979

[54] VACUUM UNION FOR AN INTERNAL COMBUSTION ENGINE

[75] Inventors: Eiji Adachi; Juichi Shibatani; Sadayoshi Ito, all of Toyota, Japan

[73] Assignee: Toyota Jidosha Kogyo Kabushiki Kaisha, Aichi, Japan

[21] Appl. No.: 815,772

[22] Filed: Jul. 14, 1977

[30] Foreign Application Priority Data

Oct. 25, 1976 [JP] Japan ................................ 51-127374

[51] Int. Cl.² ........................................... B60T 13/46
[52] U.S. Cl. ....................................... 60/397; 60/407; 60/484; 60/547 R; 138/40; 138/44
[58] Field of Search .......... 123/117 A, 103 R, 198 R; 60/547, 397, 411, 407, 484; 91/525, 530; 138/40, 44; 137/605; 285/156

[56] References Cited

U.S. PATENT DOCUMENTS

| | | | |
|---|---|---|---|
| 1,762,390 | 6/1930 | Gavaza | 137/605 |
| 1,807,277 | 5/1931 | Bragg | 60/397 |
| 1,944,456 | 1/1934 | Pearson | 137/605 |
| 2,732,685 | 1/1956 | Oishei | 60/397 |
| 3,517,685 | 6/1970 | Eastman | 138/40 |
| 3,707,954 | 1/1973 | Nakada | 123/117 A |
| 4,043,123 | 8/1977 | Konishi | 60/397 |

*Primary Examiner*—Abraham Hershkovitz
*Attorney, Agent, or Firm*—Stevens, Davis, Miller & Mosher

[57] ABSTRACT

A vacuum union having a tubular body adapted for transmitting a vacuum signal from an intake pipe of an internal combustion engine of a vehicle to a vacuum-operated brake booster of a vehicle brake device, and a branch pipe adapted for transmitting a vacuum signal from the tubular body to other vacuum-operated engine controlling devices. An orifice for restricting the level of the vacuum signal, to be transmitted to the brake booster, is located downstream of a branch pipe with respect to the intake pipe. Therefore, a drop in the vacuum level is effectively decreased for maintaining the proper operation of the brake device, even if the controlling devices are damaged, thereby causing the branch pipe to be opened to the atmosphere.

1 Claim, 4 Drawing Figures

VACUUM UNION FOR AN INTERNAL COMBUSTION ENGINE

FIELD OF THE INVENTION

The present invention relates to a vacuum union for transmitting a vacuum signal from an intake pipe of an internal combustion engine into a vacuum-operated brake booster of a vehicle brake device and into other vacuum-operated engine-controlling devices.

BACKGROUND OF THE INVENTION

In a vehicle provided with an internal combustion engine, vacuum formed in an intake pipe of the engine is used for operating the brake booster of a vehicle brake device, various exhaust gas cleaning devices, air conditioning devices, vacuum meters, and the like. If each of the above-mentioned devices is connected, via a respective vacuum pipe, to the intake pipe, an increase in the manufacturing cost, as well as an increase in the complexity of the structure of the intake pipe, is inevitable.

Therefore, a vacuum union capable of transmitting a vacuum signal to the various devices from the intake pipe has been provided. Because the vacuum level required by the brake booster is relatively higher than the vacuum level required by other devices (in other words, the exhaust gas cleaning devices, the air conditioning devices, the vacuum meters, and the like), the vacuum union is comprised of a tubular body of a large diameter mounted to the intake pipe for connecting the intake pipe to the brake booster, and a branch pipe of a small diameter mounted to the tubular body for connecting the body to the other above-mentioned devices. An orifice, for adjusting the level of the vacuum signal to be transmitted to the brake booster, is arranged in the tubular body.

However, because the orifice is arranged upstream of the branch pipe with respect to the intake pipe in the known vacuum union, the level of the vacuum signal which is transmitted to the brake booster drops considerably when one of the vacuum-operated devices other than the brake booster is damaged, thereby opening the branch pipe to the atmosphere. This causes bad operations of the brake booster, which in turn may cause a very dangerous driving condition when the vehicle is being operated at a high speed.

SUMMARY OF THE INVENTION

An object of the present invention is to provide a vacuum union capable of overcoming the above-mentioned drawbacks of the known art.

In order to attain this object, according to the invention, a vacuum union is provided, which is adapted for transmitting a vacuum signal from an intake pipe of an internal combustion engine of a vehicle into a vacuum-operated brake booster of the vehicle brake device, and into other engine controlling devices operated by the vacuum signal, said union comprising:

a tubular body mounted onto the intake pipe adapted for connecting the intake system to the brake booster, said body having a lateral hole which is formed in the tubular wall of said body therethrough, said hole having a portion with a small dimension;

a branch pipe fixably inserted to an outer end of the lateral hole of the tubular body, which branch pipe is adapted for connecting the tubular body with the above-mentioned other engine controlling devices, and;

an orifice formed in said tubular body located on one side of said lateral hole remote from said intake pipe, said orifice having a predetermined dimension larger than the dimension of the portion of the lateral hole, said orifice being adapted for adjusting the level of the vacuum signal transmitted to said brake booster from said intake pipe of the engine. As a result of this arrangement of the union of the present invention, a sufficient level of the vacuum signal to be transmitted to the brake booster via the orifice is maintained, which permits the proper operation of the brake booster even if the branch pipe were accidentally opened to the atmosphere.

DESCRIPTION OF A PREFERRED EMBODIMENT

Figure 1:
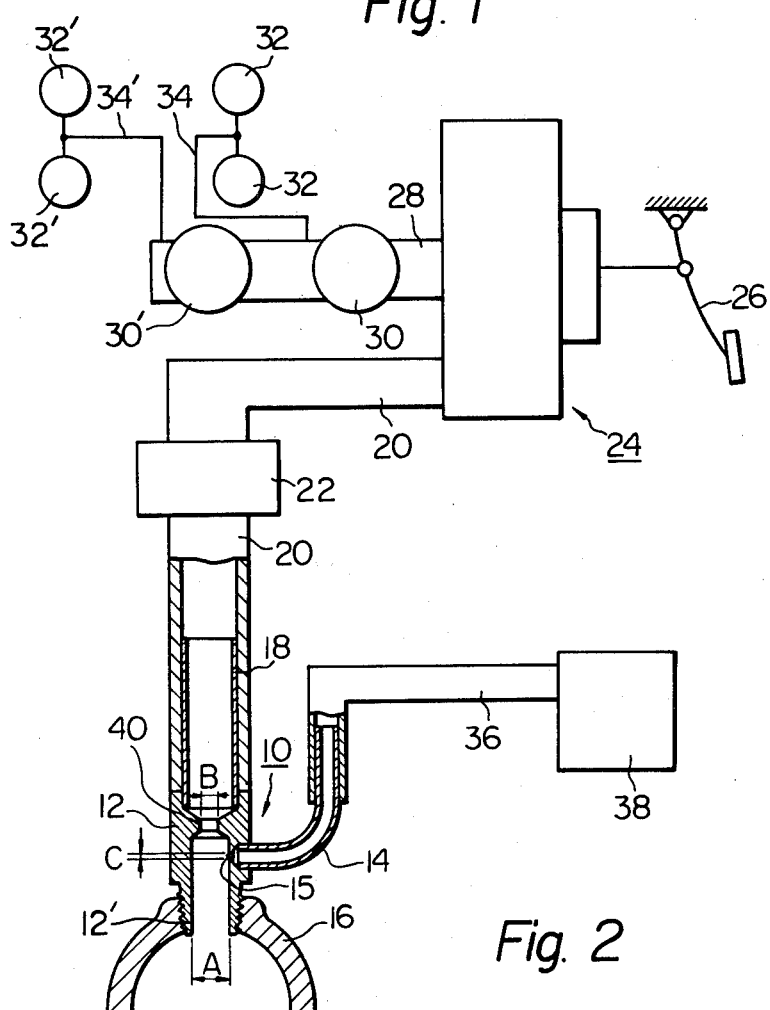
FIG. 1 is a sectional view of a vacuum union according to the invention.

In FIG. 1, numeral 10 designates a vacuum union, according to the present invention, adapted for being mounted onto the intake pipe of an internal combustion engine, in order to transmit a vacuum signal from the intake pipe 16 into a brake booster 24 of the vehicle brake device or into other engine controlling devices 38. The union 10 has a tubular body 12 which has, on one end thereof, a tapered thread portion 12' which is fixably screwed into a respective thread hole formed in the intake pipe 16 of the internal combustion engine. A connection pipe 18 is fixably inserted to the other end of the tubular body 12. To this connection pipe 18, one end of a vacuum hose 20 is inserted. The other end of the hose 20 is connected to one side of a check valve 22. Another side of the check valve 22 is connected to the brake booster 24 of the vehicle brake device, via a vacuum hose 20'. The brake booster 24 as is already known, has a diaphragm (not shown) therein to form a first vacuum chamber (not shown), which chamber is always connected to the pipe 20' on one side of the diaphragm. The brake booster 24 has a second chamber (not shown) on the other side of the diaphragm, said second chamber being connected to the first chamber when the brake is not in operation. When a brake pedal 26 is stepped upon to stop the vehicle, the second chamber which has been previously connected to the first chamber is now connected to the atmosphere, thereby causing the diaphragm to be moved toward a master cylinder 28. As a result of the movement of the diaphragm, a piston (not shown) inserted in the master cylinder 28 causes the brake oil stored in the oil reservoirs 30 and 30' to be urged toward the wheel brake cylinders 32 and 32' respectively, via the brake oil hoses 34 and 34', respectively.

Figure 2:
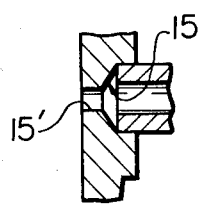
FIG. 2 is an enlarged partial view of FIG. 1.

A lateral hole 15 is formed in the tubular wall of the tubular body 12 therethrough. A branch pipe 14 is, at one end thereof, inserted and secured to an outer open end of the lateral hole 15. A vacuum hose 36 is, at one end thereof, inserted to the other end of the branch pipe 14. The other end of the hose 36 is connected to various vacuum-operated engine control devices 38 (for example, exhaust gas cleaning devices, air conditioning devices, or vacuum level meter devices), in order to transmit a vacuum signal from the tubular body 12 to the vacuum-operated engine control devices 38. The lateral hole 15 has, as shown in FIG. 2, a portion 15' of a small dimension for controlling the level of the vacuum signal transmitted to the vacuum-operated engine control devices 38.

An orifice 40 is formed on the inner surface of the tubular body 12 in order to adjust the level of the vacuum signal transmitted into the brake booster 24 from the intake pipe 16. The dimension B of the orifice 40 is caused to be larger than the dimension C of the portion 15' of the hole 15, because the level of the vacuum signal to be transmitted to the brake booster 24 is higher than the level of the vacuum signal to be transmitted to the engine control devices 38.

According to the present invention, the orifice 40 is located on one side of hole 15 remote from the intake pipe 16. As a result of this arrangement of the orifice 40, a sufficient level of the vacuum signal to be transmitted to the brake booster 24 is maintained, even if the branch pipe 14 were opened to the atmosphere due to one of the engine control devices 38 being damaged. This is hereinafter illustrated with reference to FIGS. 3a and 3b.

Figure 3A:
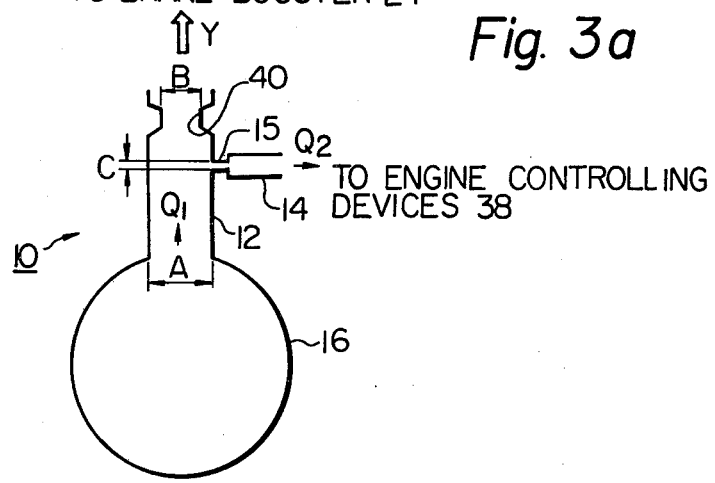
FIG. 3a is a schematic view of the vacuum union of the present invention.

According to the invention, the orifice 40 is located on the side of the lateral hole 15 remote from the intake pipe 16 as shown in FIG. 3a. The vacuum level Y to be transmitted to the brake booster 24 corresponds to the difference between the vacuum level $Q_1$ to be introduced into the tubular body 12 of the union 10 from the intake pipe 16 and the vacuum level $Q_2$ to be introduced into the engine controlling devices 38 from the lateral hole 15. In this case, $Q_1$ corresponds to the dimension A of the tubular body 12, whereas $Q_2$ corresponds to the dimension C of the hole 15. As a result of the above condition, the following equation is obtained.

$$Y = Q_1 - Q_2 = A - C \tag{1}$$

Figure 3B:
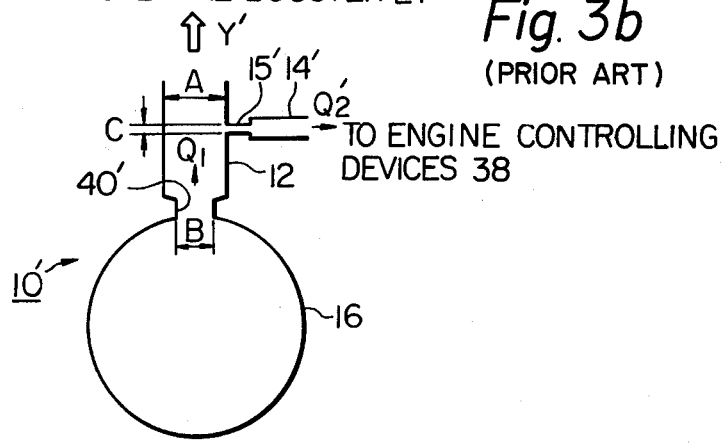
FIG. 3b is a schematic view of a known vacuum union.

In a known vacuum union 10', an orifice 40' is arranged on one side of the lateral hole 15' adjacent to the intake pipe 16, as shown in FIG. 3b. Therefore, the vacuum level Y' to be transmitted to the brake booster 24 corresponds to the difference between the vacuum level $Q_1'$ to be introduced into the orifice 40' from the intake pipe 16 and the vacuum level $Q_2'$ to be introduced into the engine controlling devices 38 from the lateral hole 15'. In this case, $Q_1'$ corresponds to the dimension B of the orifice 40', whereas $Q_2'$ corresponds to the dimension C of the lateral hole 15'. As a result of the above condition, the following equation is obtained.

$$Y' = Q_1' - Q_2' = B - C \tag{2}$$

When the equations (1) and (2) are compared together, it is understood that the vacuum level Y obtained by the union 10 of the present invention is higher than the vacuum level Y' obtained by the known union 10', because the dimension A is larger than the dimension B. As a result of this, a sufficient level of the vacuum signal can be transmitted to the brake booster 24, even if the branch pipe 14 were opened to the atmosphere due to one of the engine controlling devices 38 being damaged. Therefore, an effective brake operation of the brake device of the vehicle is always maintained, when the vacuum union 10 of the present invention is used. This is very advantageous from the point of view of safety.

EXAMPLE

The degree of the drop in the level of the vacuum signal transmitted to the brake booster 24 from the intake pipe 16, was measured under various engine operating conditions. The results are shown in the following table.

| Operating condition | Idle | 50km/h | Engine brake |
|---|---|---|---|
| Present invention | 12% | 8.8% | 12% |
| Known art | 25% | 21% | 28% |

It is clear from this table that the degree of drop in the level of the vacuum signal transmitted to the brake booster 24 is effectively reduced by the present invention. Therefore, an effective brake operation can be expected from the present invention, even if one of the engine controlling devices were damaged.

What is claimed is:

1. A vacuum-operated system in a vehicle internal combustion engine having an intake pipe in which vacuum pressure is produced, said system comprising:

a vacuum-operated brake booster;

at least one vacuum-operated engine controlling device; and a vacuum union for transmitting a vacuum signal from the intake pipe to both the brake booster and the at least one engine controlling device, said vacuum union comprising:

a tubular body which has one end thereof connected to the intake pipe and the other end thereof connected to the brake booster, said body having a lateral hole formed in the tubular wall of said body, said hole having a portion of a small dimension;

a branch pipe having one end thereof fixably inserted into an outer end of the lateral hole of the tubular body, the other end of said branch pipe being connected to said at least one engine controlling device; and a stationary orifice defined in said tubular body at a position located on one side of said lateral hole remote from said intake pipe, said orifice having a dimension larger than the dimension of said lateral hole and smaller than a corresponding dimension of said one end of the tubular body, whereby a sufficient level of the vacuum signal transmitted to said brake booster via said orifice is effectively maintained for maintaining proper operation of the brake booster even if the branch pipe is accidentally opened to the atmosphere during the use of the union due to one of said at least one engine controlling device being damaged.

* * * * *